(12) United States Patent
Crewe

(10) Patent No.: US 8,813,614 B2
(45) Date of Patent: Aug. 26, 2014

(54) MULTI-BIT TOOL

(75) Inventor: William Crewe, West Busselton (AU)

(73) Assignee: Crewe-Tech Pty Ltd, West Busselton (AU)

( * ) Notice: Subject to any disclaimer, the term of this patent is extended or adjusted under 35 U.S.C. 154(b) by 298 days.

(21) Appl. No.: 13/520,574

(22) PCT Filed: Jan. 12, 2011

(86) PCT No.: PCT/AU2011/000026
§ 371 (c)(1), (2), (4) Date: Sep. 11, 2012

(87) PCT Pub. No.: WO2011/085440
PCT Pub. Date: Jul. 21, 2011

(65) Prior Publication Data
US 2013/0199343 A1     Aug. 8, 2013

(30) Foreign Application Priority Data

Jan. 12, 2010 (AU) ................. 2010900079
Sep. 15, 2010 (AU) ................. 2010904163

(51) Int. Cl.
*B25F 1/04* (2006.01)
*B25B 15/00* (2006.01)
*B25B 23/00* (2006.01)
*B25G 1/08* (2006.01)
*B23B 51/12* (2006.01)
*B25F 1/02* (2006.01)

(52) U.S. Cl.
CPC . *B25F 1/02* (2013.01); *B23B 51/12* (2013.01); *B25G 1/085* (2013.01); *B25B 15/001* (2013.01); *B25B 23/0035* (2013.01)

USPC ............................. 81/439; 81/177.4

(58) Field of Classification Search
USPC ............... 81/439, 440, 177.4, 124.5
See application file for complete search history.

(56) References Cited

U.S. PATENT DOCUMENTS 3,194,286 A * 7/1965 Wagner ..................... 81/439
3,336,611 A   8/1967 Schepp (Continued)

FOREIGN PATENT DOCUMENTS

GB    2268105 A   1/1994
JP    2002066937  3/2002

*Primary Examiner* — David B Thomas
(74) *Attorney, Agent, or Firm* — Cascio & Zervas

(57) ABSTRACT

A multi-bit tool (1) including a housing (2) and a drive input shaft (3). The housing incorporates at least two storage recesses (5) accessible from outside the housing. The housing may include a first (6) and a second (7) socket, each axially aligned with the drive input shaft, the first socket being smaller than the second socket and positioned intermediate the second socket and the drive input shaft such that tool bits (4) driven by the first socket pass through the second socket to drivably engage with the first socket. It is preferable that the storage recesses communicate with a central bore to permit the active bit to be internally interchanged. To this end the housing may further incorporate a bore axially aligned with the drive input shaft and the first and second sockets. The tool may further include a sleeve (20) and bolt (21) assembly operable between a bit loading position and a working position, the bolt having a claw (35) to engage a waisted portion (15) of the tool bit, a flange portion (41) and a drive input portion being the drive input shaft (3). In use, the tool drives bits through the drive input shaft which receives drive input to the bolt part of the tool, the flange portion of the bolt driving the housing to thereby transmit the drive input to the first and second sockets of the housing.

21 Claims, 13 Drawing Sheets

(56) References Cited

U.S. PATENT DOCUMENTS

| | | | |
|---|---|---|---|
| 3,753,455 A * | 8/1973 | Butler | 81/439 |
| 3,932,904 A | 1/1976 | Nilsson et al. | |
| 3,965,510 A | 6/1976 | Ernst | |
| 4,107,800 A | 8/1978 | Jorgensen | |
| 5,325,745 A * | 7/1994 | Koehler | 81/439 |
| 5,520,075 A | 5/1996 | Barmore | |
| 6,134,995 A * | 10/2000 | Shiao | 81/439 |
| 6,269,717 B1 | 8/2001 | Bollinger | |
| 6,305,255 B1 | 10/2001 | Wu | |
| 6,601,483 B2 * | 8/2003 | Wannop | 81/490 |
| 6,739,226 B2 * | 5/2004 | Beauchamp | 81/490 |
| 6,851,344 B1 * | 2/2005 | Wade | 81/490 |
| 7,565,852 B2 * | 7/2009 | Yu | 81/177.4 |
| 2003/0084758 A1 * | 5/2003 | Chiang | 81/490 |
| 2006/0016303 A1 * | 1/2006 | Ping | 81/490 |
| 2011/0214539 A1 * | 9/2011 | Grand | 81/439 |

* cited by examiner

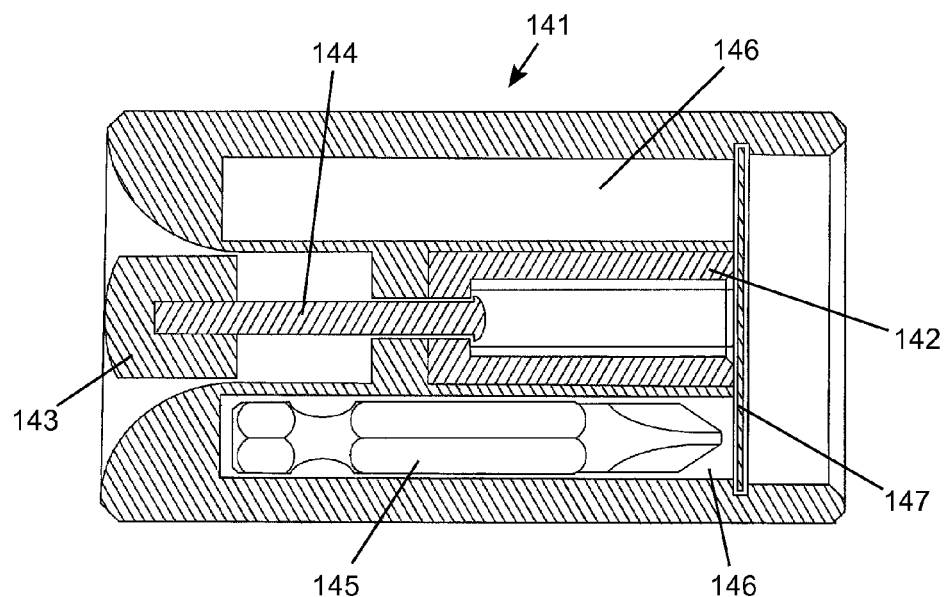
Figure 27
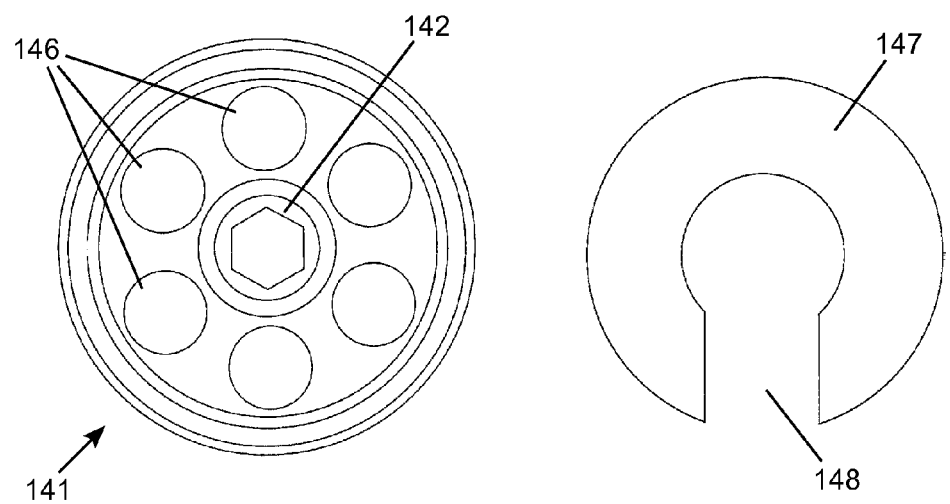 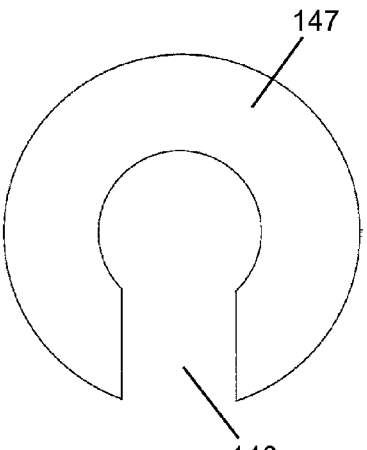
Figure 28  Figure 29

MULTI-BIT TOOL

FIELD OF THE INVENTION

The present invention relates to hand or power operated tools and in particular to multi-bit driver tools in which multiple bits are stored and can be selectably moved between a stored and an operative position.

BACKGROUND OF THE INVENTION

There are known many multi-bit tools in which multiple driver bits can be stored and selected for use. Some of the simplest such as U.S. Pat. No. 4,273,173 provide storage for multiple driver bits, a selector allowing the desired bit to be retrieved from the storage portion of the tool and manually placed into the driving socket of the tool. This involves extracting the driver bit from the storage location and then manually fitting it into the driving socket of the hand tool.

Other more sophisticated multi-bit tools are also known in which the working bits may be interchanged without having to remove them from the tool. For example in U.S. Pat. No. 4,572,038 the bits are stored in a magazine mounted eccentrically on the main drive axis of the tool. The magazine allows the bits to be rotated to position the desired bit in line with the main drive axis of the tool where an inner shaft engages with the bit, allowing that desired bit to be extruded from the end of the main drive axis of the tool for use. However, as the magazine is eccentric, if it rotated with the bit in use, the tool would be unstable at speed (ie for use with a power tool such as a powered drill), so the magazine can remain stationary, with the shaft driving the bit inside a sleeve portion of the tool, but that requires the shaft to drivably engage with the bit, requiring specialised or proprietary bits (ie conventional bits, as available and interchangable with hex-drive hand and powered drills and drivers, would not work in this prior invention).

A further example of a multi-bit driver is disclosed in U.S. Pat. No. 4,480,668. Again the bits are stored in an eccentric magazine with one bit position in line with the main drive axis of the tool, the magazine being rotated inside the handle of the tool through an access hole in the side of the handle. To load a bit from the magazine, the desired bit position is selected by rotating the magazine inside the tool, then the tool is held with the hex drive socket pointing downwards so gravity allows the bit to slide out of the magazine into the drive socket, the drive socket including a spring loaded ball type clamping head which must be operated to allow the bit to reach the operating or working position and be locked there axially. Similarly returning a bit to the magazine requires operation of the clamping head and inverting the tool, handle downwards, so that gravity can return the bit into the magazine in the handle. Although this tool can use conventional bits, it is not designed for use with power tools having an incompatible construction and interchanging bits requires the whole assembly to be inverted.

There is a further deficiency common to all the prior art—that is the maximum hex drive size is limited by the size of the bits being stored.

It is therefore an object of the present invention to provide a multi-bit tool which overcomes one or more disadvantages of the prior art.

It is an optional object of the invention to provide a hex drive larger than the size of the bits being stored.

SUMMARY OF THE INVENTION

With the aforementioned in view, there is provided a multi-bit tool including a housing incorporating at least two tool storage recesses, a bore and a drive socket portion axially aligned with the bore, each recess providing a storage location for a tool bit. The tool also includes a sleeve axially located such that the sleeve may rotate in the bore of the housing, the sleeve including a flange portion and a slot portion. The sleeve can be described as being rotatably located in the housing as it is able to rotate (or is not rotationally located) about a major axis of the housing, but is constrained from the other rotational displacements and all linear displacements (axial and radial) relative to the housing. The tool further includes a bolt slidably located in the sleeve between a bit loading position and a working position, the bolt having a claw, a flange portion and a drive input portion. The claw is provided to accommodate a drive end of a tool bit and provide axial location of the tool bit relative to the bolt. The flange portion includes at least one eccentric protrusion extending radially from the flange to engage with the end of one of said at least two recesses to provide rotational location of the bolt relative to the housing. In this arrangement, the drive input portion of the bolt receives drive input to the tool, the flange portion of the bolt transfers the drive to the housing to thereby transmit the drive input to the drive socket portion of the housing.

The multi-bit tool allows selection of a tool from one of said recesses by aligning the slot of the sleeve with the recess, then drawing back the bolt to the bit loading position such that the flange is dis-engaged from the end of any of said at least two recesses and the claw at the end of the bolt is aligned with the slot and recess to receive the desired tool bit. Then the tool bit can fall into the claw of the bolt under gravity, and the bolt be returned to the working position in which the tool bit is engaged into the drive socket portion of the housing and in which the claw locates the tool bit axially.

The drive socket portion may include a tool bit drive socket for driving the tool bits stored in the housing and an additional (larger) drive socket at the end of the housing for driving external tool bits or fasteners (when no tool bit is engaged in the drive socket portion). For example, the tool bit drive socket may be a ¼" hex to receive standard size tool bits from other tools and the additional (larger) drive socket at the end of the housing may be a 5⁄16" hex to drive self drilling/tapping screws such as tek screws. The additional (larger) drive socket can only be used when the tool bit drive socket is not in use (i.e. when no ¼"hex drive tool bits are extending through the 5⁄16"hex portion in the above example). The tool bit drive sockets do not need to be hexagonal sockets. For example the additional (larger) drive socket could be a square drive of sufficient size that the tool bits for the tool bit drive socket can pass through.

One or more forms of the present invention may provide a multi-bit tool including a housing and a drive input shaft. The housing includes a first and a second socket, each axially aligned with the drive input shaft, the first socket being smaller than the second socket and positioned intermediate the second socket and the drive input shaft such that tool bits driven by the first socket pass through the second socket to drivably engage with the first socket.

The first socket may be a tool bit drive socket and the second socket may be a larger tool bit drive socket than the first socket, such that the second socket is able to drive tool bits with a higher torque rating than tool bits for the first socket. Alternatively, the first socket may be a tool bit drive socket and the second socket may be a fastener drive socket. In this case, the housing directly drives fasteners through the fastener drive socket feature.

The drive input shaft may have at least 3 sides in cross-section. Although most drill and driver chucks have 3 jaws, making 6 sides preferable (ie the drive input shaft is preferably hexagonal in cross-section), some tools use alternative profiles such as square drives (so the drive input shaft could have 4 sides).

The drive input shaft may be fixed to the housing. The drive input shaft may be permanently fixed to the housing (i.e. manufactured separately and permanently fixed to the housing or formed as an integral part of the housing) effectively being a twin concentric socket drive adaptor. Alternatively the drive input shaft may be selectively fixed to the housing to transfer drive from the drive input shaft to the housing and thereby to the first and second sockets of said housing.

The housing may incorporate at least two storage recesses. These may be accessible from outside the housing either radially or axially. However is it is preferable that the storage recesses communicate with a central bore. To this end the housing may further incorporate a bore, the bore being axially aligned with the drive input shaft and the first and second sockets. The tool may further include a sleeve axially located such that the sleeve may rotate in the bore of the housing, the sleeve including a flange portion and a slot portion. The sleeve can be described as being rotatably located in the housing as it is able to rotate (or is not rotationally located) about a major axis of the housing, but is constrained from the other rotational displacements and all linear displacements (axial and radial) relative to the housing. There may be a bolt slidably located in the sleeve between a bit loading position and a working position, the bolt having a claw, a flange portion and a drive input portion, the drive input portion of the bolt being the drive input shaft (ie one end of the bolt may include say a male hex portion). The claw may be provided to accommodate a drive end of a tool bit and provide axial location of the tool bit relative to the bolt. The flange portion may include at least one eccentric protrusion extending radially from the flange to engage with the end of one of said at least two recesses to provide rotational location of the bolt relative to the housing. In use, the tool drives bits through the drive input shaft receiving drive input to the bolt part of the tool, the flange portion of the bolt driving the housing to thereby transmit the drive input to the first and second sockets of the housing.

The multi-bit tool allows selection of a tool from one of said recesses by aligning the slot of the sleeve with the recess, then drawing back the bolt to the bit loading position such that the flange is dis-engaged from the end of any of said at least two recesses and the claw at the end of the bolt is aligned with the slot and recess to receive the desired tool bit. Then the tool bit can fall into the claw of the bolt under gravity, and the bolt be returned to the working position in which the tool bit is engaged into the first socket of the housing and in which the claw locates the tool bit axially.

The bolt may include a shaped slot and the sleeve may include a radial hole, a pin being provided in the radial hole to engage in the shaped slot in the bolt such that as the bolt slides axially within the sleeve, a maximum axial displacement of the bolt relative to the sleeve is limited in at least one direction and the rotational position of the bolt relative to the sleeve is controlled.

The sleeve may include a radial hole, a detent ball being spring-loaded along the axis of the radial hole to engage with one of two detent depressions made in the bolt at the bit loading position and the working position of the bolt.

The housing may include a radial hole, a detent ball being spring-loaded along the axis of the radial hole to engage with a respective detent depression made in the sleeve at each position where the slot portion of the sleeve is radially aligned with one of said at least two recesses.

The flange portion may provide a stop limiting the axial travel of the bolt relative to the housing in one direction.

The at least two recesses may be spaced equi-distant around the bore. If the recesses are spaced equidistant around the bore and continue to the end of the housing adjacent the drive input portion of the bolt, then the at least one eccentric protrusion extending radially from the flange of the bolt will engage with the end of at least one of the recesses in the housing when the bolt is in a working position. The bolt has the same number of working positions as the number of recesses in the housing. Indeed no matter how many recesses there may be (2, 3, 4 or more) the flange can have a similar number of eccentric radial protrusions to mate with the ends of the recesses and the protrusions on the flange will mate with the ends of the recesses in each working position of the bolt.

The drive input portion of the bolt may be driven by a power tool. As the multi-bit tool has a housing which does not generate a large eccentric mass about the driving shaft, the whole multi-bit tool can rotate with the tool bit (drill, socket, driver, etc.) or fastener being driven. The balance is such that the tool is suitable for use with power tools such as electric drills and drivers.

The bolt may include a rotational location surface adjacent the claw. The rotational location surface may be parallel to a major axis of the bolt and positioned to align the drive end of the tool bit with the tool bit drive socket as the bit passes from the loading position to the working position.

There may be provided at least one locking pin hole in the housing, each locking pin hole including a locking pin. In this case the multi-bit tool may also include a locking pin hole in the sleeve for each of said at least two tool storage recesses, a locking pin dropping partially into the locking pin hole in the sleeve when a bit is selected to prevent rotation of the sleeve relative to the housing, the locking pin dropping out of the hole in the sleeve when a bit is unloaded to permit relative rotation between the sleeve and the housing.

Alternatively there may be provided a locking pin hole in the sleeve, with a locking pin provided in said locking pin hole in the sleeve. In this case, the multi-bit tool may further include a locking pin hole in the housing for each of said at least two tool storage recesses, the locking pin dropping partially into one of the locking pin holes in the housing when a bit is selected to prevent rotation of the sleeve relative to the housing, the locking pin dropping out of the hole in the housing when a bit is unloaded to permit relative rotation between the sleeve and the housing.

A locking tab or arm may be provided to selectively permit or prevent the bolt from sliding out of the working position towards the bit loading position.

A locating pin or tab may be provided between the sleeve and the housing to locate the sleeve in an axial direction but permit relative rotation between the sleeve and the housing. For example, a locating tab may be provided in a slot in the housing, the locating tab preventing the sleeve from moving relative to the housing in at least one axial direction.

The drive input portion of the bolt may be driven by a handle such as a screw driver handle, ie the multi-bit tool may be used as a hand tool. The handle may include storage for additional tool bits.

The drive input portion of the bolt may be a ¼" hex drive.

It will be convenient to further describe the invention by reference to the accompanying drawings which illustrate preferred aspects of the invention. Other embodiments of the invention are possible and consequently the particularity of the accompanying drawings is not to be understood as superceding the generality of the preceding description of the invention.

BRIEF DESCRIPTION OF THE DRAWINGS

In the drawings:

FIG. 27 is a cross-sectional view of a handle.

FIG. 28 is a view of the end of the handle with the selector disc removed.

FIG. 29 shows the handle selector disc.

DETAILED DESCRIPTION OF THE INVENTION

Figure 1:
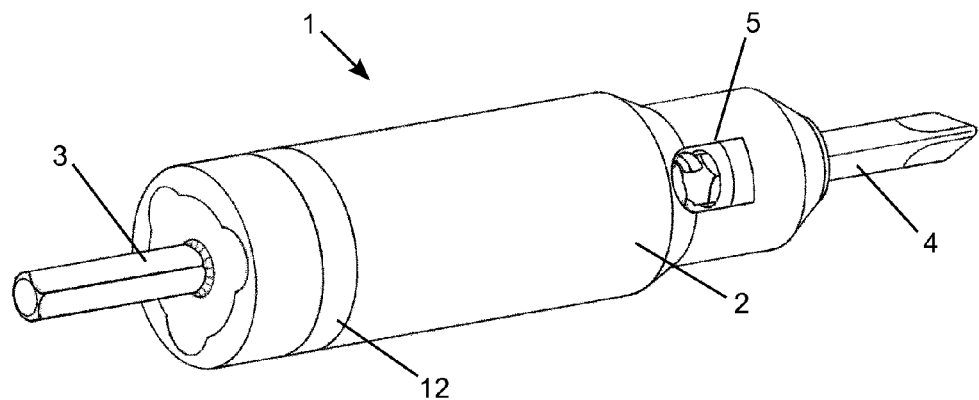
FIG. 1 is a three dimensional view of a multi-bit tool of a first possible embodiment of the present invention.

Referring initially to FIG. 1, a possible embodiment of the multi-bit tool 1 of the present invention is shown. The tool has a housing 2, which receives drive at one end from a drive input shaft 3 and transmits that drive to a tool bit 4 held in the opposite end of the housing. The housing can also store tool bits in recesses or chambers 5.

Figure 2:
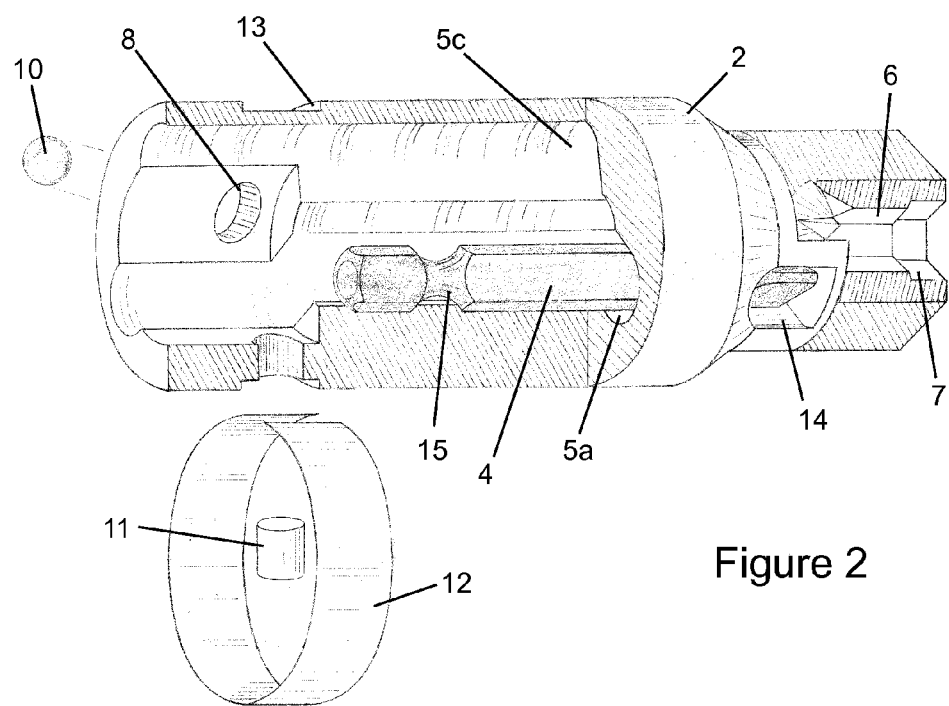
FIG. 2 is a partial cross-section of the housing of the first embodiment.

FIG. 2 illustrates the housing with portions cut away to show the tool bit storage recesses 5a, 5b, and 5c. A tool bit 4 is shown in the recess 5a, although the selection mechanism is omitted for clarity. A tool bit drive socket portion 6 is formed into the housing at one end to receive and drive the tool bits 4. A second, larger drive socket 7 is shown also, outside the tool bit drive socket 6. This can be used to drive tool bits having a larger drive. However it is most useful if designed as a fastener drive socket, allowing the housing to directly drive fasteners without the need for an additional bit. For example, a drill bit can be selectively loaded into the tool bit drive socket 6, passing through the larger secondary drive socket 7, allowing pilot holes to be drilled. Then the drill bit can be retracted into the housing and the second drive socket 7 used to drive fasteners into the pilot holes without the need for another tool bit. Many such fasteners such as tek screws have hex heads which cannot be driven by a tool bit small enough to pass into the housing for storage, but the provision of a second, larger drive socket outside the tool bit drive socket allows the multi-bit tool to be used for fasteners such as tek screws in addition to multiple other smaller drive tool bits. Most interchangeable tool bits for drill and hand tools are ¼" hex drive and can therefore easily pass through the 5/16" hex drive of a tek screw socket. Other sizes (⅜", metric, etc.) and shapes (i.e. square) of tool bit drive socket and/or secondary socket can be used as long as the tool bits for the tool bit drive socket can pass through the secondary socket.

The housing 2 incorporates radial holes 8 and 9 to receive a ball 10 and a pin 11, held in place by a spring clip or band 12, shown to the side of the housing. In use the band 12 sits in the groove 13. The ball and pin are used in location of the sleeve shown in FIG. 3, relative to the housing 2.

Figure 3:
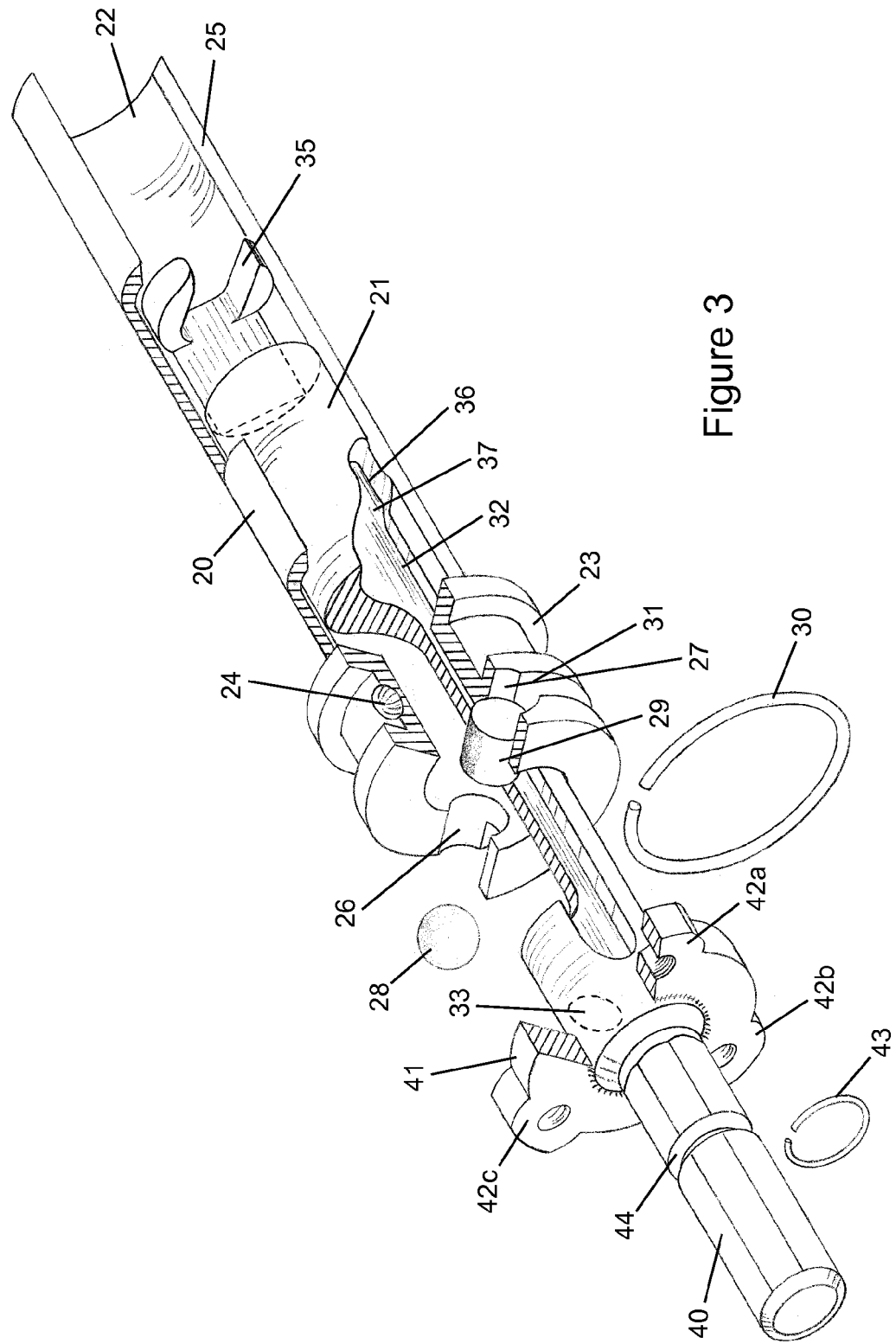
FIG. 3 is a detailed cross-sectional view of the sleeve and bolt.

FIG. 3 shows the sleeve 20 and bolt 21 which in use, are located inside the housing and allow the selection and swapping of tool bits between the storage recesses 5a-c and the tool bit drive socket 6. The sleeve 20 includes a channel 25 cut out to allow tool bits to pass between the storage recesses and the centre of the housing (on their way to or from the tool bit drive socket 6). At the end of the sleeve 22 through which the tool bits pass to and from the drive socket, an inwards chamfer (not shown) can be used to help guide the tool bits from the storage recess into the drive socket.

The housing is not shown in FIG. 3 and the sleeve and bolt are shown cut away in places to allow more features to be seen. In use, the sleeve is assembled into the housing and the pin 11 engages in groove 23 to hold the sleeve in position axially, while allowing it to rotate about the major axis of the housing. The detent depression 24 is one of 3 such detent positions (one for each storage recess) inside the groove 23, the ball 10 engaging with the detent feature of the selected storage recess. In this way, when the sleeve is rotated relative to the housing, it can be biassed to line up the channel 25 with one of the three tool bit storage recess positions.

The sleeve also incorporates radial holes 26 and 27 to receive a ball 28 and a pin 29, held in place by a spring clip 30 shown to the side of the sleeve. In use, the spring clip sits in the groove 31 in the sleeve. This ball and pin are used in location of the bolt 21 relative to the sleeve 20. The pin 29 engages in a groove 32 cut along the bolt 21 to allow the bolt to slide axially inside the sleeve. The ball 28 is resiliently loaded in a radial direction by the spring clip 30 and engages detent depressions on the surface of the bolt corresponding to the fully retracted position (for loading bits, detent not visible in FIG. 3) and the returned or operating position (bolt slide detent depression shown as a hidden feature 33 in FIG. 3). The rotation of the bolt about the major axis of the sleeve is also controlled by the pin 29 engaging in the bolt slide groove 32. When the bolt is in the working or operating position, the claw 35 on the end of the bolt is not aligned with the channel 25 in the sleeve. This ensures that any tool bit held in the claw is held substantially concentric to and aligned with the major axis of the bolt (and the sleeve and therefore the bore of the housing). In this position, the claw prevents the tool bit from being able to pass through the channel in the sleeve. The tool bit 4 shown in FIG. 2 includes a waisted portion 15 around which the claw fits. When the bolt is fully drawn back, ie in the fully retracted position or loading position, it is necessary that tool bits can pass through the channel 25 in the sleeve, between the storage position in the storage recess of the housing and the centrally aligned position loaded into the claw of the bolt. To this end, the groove 32 in the bolt 21 has an offset portion 36 connected to the rest of the groove 32 by an angled portion 37. As the bolt is drawn back into the loading position, the pin 29 engaged in the groove 32 passes through the angled portion 37 causing the bolt to rotate about the major axis of the sleeve until the pin passes into the offset portion 36 of the groove, aligning the claw 35 with the channel 25 of the sleeve in the loading position. In FIG. 3, the bolt slide groove (32, 36, 37) is shown approximately aligned with the opening of the claw for clarity. However, during tool loading operations the bolt is positioned with the opening of the claw pointing in a generally upwards direction, so when the bolt is drawn back the bolt slide groove would also be facing generally upwards making it potentially susceptible to dirt and swarf ingress. The bolt slide detent ball runs along the surface of the bolt and into depressions in the surface of the bolt, so ideally, both the bolt slide groove and the portion of the surface covered by the detent mechanism should not face upwards. In practice the bolt slide groove features and the bolt detent features are typically formed at positions rotated ninety degrees around the bolt major axis from their positions shown in the example of FIG. 3.

The bolt further includes a drive input shaft portion 40 and a flange 41 which includes additional nodules or protrusions (42a, 42b, 42c) extending radially from the flange. These mate with the ends of the recesses or chambers 5 in the housing when the bolt is returned to the operating or working position and transmit drive torque input from the drive input shaft 40 to the housing 2.

The drive input portion 40 of the bolt 21 can include features to help prevent unwanted sliding of the drive input shaft within a drive socket for example. This could include a groove or detent ball, or a spring clip 43 within a groove 44 as shown, the spring clip providing increased friction with a drive socket.

An indicator or marking (not shown) can be provided on the protrusion 42a aligned with the claw (and therefore close to the channel 25 in the sleeve and the chamber of the selected tool bit) as the sleeve is not visible inside the multi-bit tool.

To select or change tool bits, the procedure can be to rotate the housing until the desired tool bit is visible in the end of the chamber (say 5a in FIG. 2) facing upwards. Then drawing back the bolt, any currently loaded tool bit (if present) in the tool bit socket 6 is withdrawn by the claw and as the claw of the bolt is rotated into line with the channel in the sleeve (by the angled portion 37 and offset portion 36 of the groove 32), the currently loaded tool bit can drop into the aligned recess (say 5c) under gravity. Then holding the housing 2 so that the desired tool bit is still in the upwards facing chamber, the bolt is rotated until the indicator or marking is also at the top. This aligns the channel 25 in the sleeve with the chamber holding the desired tool bit, which then drops into the claw under gravity. Returning the bolt to the working position rotates the claw relative to the sleeve, locking the selected tool bit into the end of the bolt, the bolt then pushing the tool bit into the tool bit socket 6 ready for use.

Alternatively, the procedure can be to draw back the bolt (which will align the claw with the empty chamber any currently loaded tool bit may be previously been stored in). Then rotating the whole assembly around to get the desired tool bit in the upwards facing chamber allows the loaded tool bit to drop into the empty storage chamber or recess under gravity. Then, holding the housing stationary and rotating the bolt until the indicator is also facing upwards, the desired tool bit will drop into the claw under gravity. Finally, as with the previous procedure, returning the bolt to the working position rotates the claw relative to the sleeve, locking the selected tool bit into the end of the bolt, the bolt then pushing the tool bit into the tool bit socket 6 ready for use.

The tool bits 4 can be released from the multi-bit tool 1 by retracting the selected bit to the storage position, then keeping the bolt drawn back, inverting the housing so that the sockets face downwards, giving the tool a shake (or poking the bit inwards through the window 14 of the corresponding recess).

Figure 4:
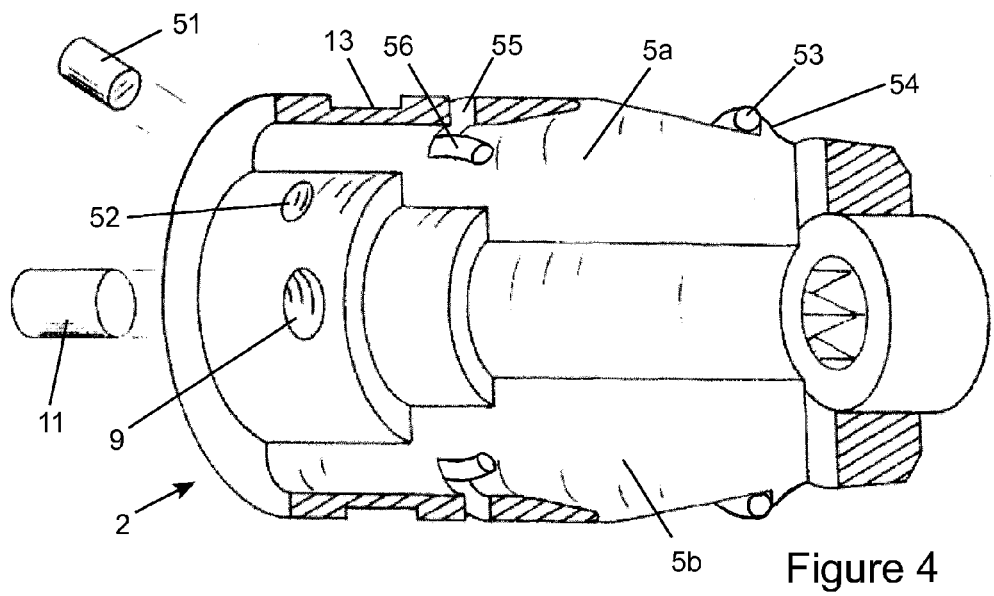
FIG. 4 is a partial cross-section of a housing for a second possible embodiment of the present invention.

FIG. 4 shows a partial section of a housing designed to house only two tool bits in recesses 5a and 5b. Using only two such recesses means that the tool bit being returned to its storage recess in the housing can fall vertically into the recess, rather than sliding down a steep slope at approximately thirty degrees from the vertical in the case of designs having three recesses. The same sleeve locating pin 11 is used through the hole 9 in the housing, the pin again being retained by a spring clip or band (such as 12 in FIG. 2 but not shown in FIG. 4). A drop in lock pin 51 is located in the hole 52 in the housing, the locking pin 51 being similarly retained from falling out of the housing by a band for example. The operation of the drop in pin is described in relation to the mating sleeve in FIG. 6.

An alternative style of recess is shown, being open through the outer wall of the housing for a large portion of the length of a tool bit to allow the bits to be loaded directly into the recesses from outside the housing. The use of this style of recess can allow the tool to be simplified by the removal of the sleeve and bolt, with the centre of the housing including a wall at the bottom of each storage recess to house the stored tool bit. The housing could include the drive input shaft in this case, but becomes a simple tool bit storage housing rather than including the internal bit selection mechanism including the sleeve and bolt, although it has the advantage over known tools of having twin drive sockets to permit driving of two different sizes or shapes of bit and/or screw for example. However for speed and ease of use it is preferable to incorporate the internal bit selection mechanism as shown.

To prevent the tool bits from falling out a movable band 53 can be used to sit against a shoulder 54 on the outside of the housing near the tips of the tool bits. The band 53 can be an O-ring for example and can be rolled along the increasing diameter of the tapered portion of the outside of the housing to expose the recess for loading. The resilience in the O-ring and the taper of the outside of the housing can then be used to cause the O-ring to roll back against the shoulder 54. Alternatively any other form of moveable restraint could be used such as a sliding collar or a rotating collar with a section cut out to align with the recess during loading or unloading of the tool bits.

It can be advantageous to restrain the tool bits axially in the recesses, to prevent them sliding into the bolt, tip first, at an angle to the bolt. The groove 55 cut into the outside of the housing and into the edge of each recess houses a resilient band 56 (which can be a spring clip or an O-ring for example). The resilient band runs through the recess in the region of the waisted portion near the base of the tool bit (not shown). This helps to hold the tool bit in the stored position until the sleeve and bolt are in the correct positions for the bit to drop directly into position during loading, preventing misalignment when the bolt is returned.

Figure 5:
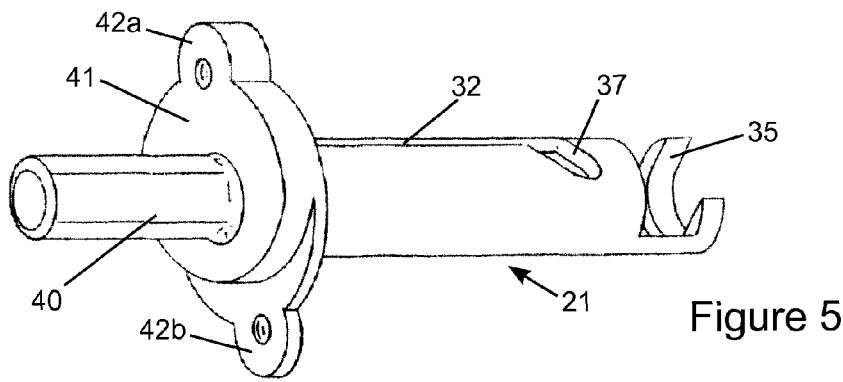
FIGS. 5 and 6 show the bolt and sleeve for the second possible embodiment of the present invention.

FIG. 5 shows a bolt 21 for the two-recess housing of FIG. 4. The flange 41 of the bolt is thinned around the nodule 42b extending in a generally opposite direction to the open section of the claw 35. This is to compensate for the reduced weight of the empty chamber from which the tool in use was selected.

Figure 6:
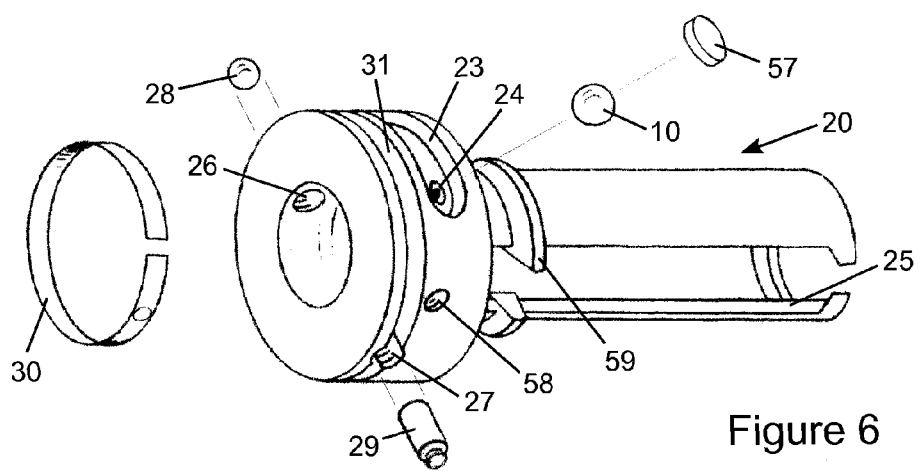

FIG. 6 shows a sleeve 20 for the two-recess housing of FIG. 4. The bolt slide detent ball 28 and pin 29 are the same as in FIG. 3. The sleeve axial locating pin 11 (shown in FIG. 4) is permanently engaged in the groove 23. However unlike the groove in FIG. 3, the groove 23 in FIG. 6 no longer continues all the way around the outside of the sleeve 20 so the pin 11 can also act as an end stop to limit rotation of the sleeve within the housing between two extents being the positions to access the first and second recesses 5a and 5b. In each position is a detent depression 24 into which the detent ball 10 drops to bias the rotational position of the sleeve in a position where the channel 25 lines up with one of the two storage recesses. The pin and detent ball are located in radial holes on opposite sides of the housing, 180 degrees apart. The ball 10 runs around the outer diameter of the sleeve. A cap 57 can be used between the ball and the retaining spring clip (not shown, but similar to that in 12 in FIG. 2).

Also in the outer diameter surface of the sleeve is a hole 58 to receive the drop in locking pin 51 (shown in FIG. 4). There are two such locking pins in this arrangement where the locking pins 51 are housed in the housing and drop into the sleeve, each locking pin being located close to the recess positions, but offset slightly to avoid the reduce housing wall thickness due to the recess cuts. When the housing is rotated to select the tool in the uppermost recess position, the locking pin 51 drops into the hole 58 to lock the sleeve from rotating relative to the housing as the selected tool drops into the claw and the bolt is returned to the operating position, preventing the sleeve from moving during this procedure as would be possible if located only by a detent mechanism. During the process of returning a tool from the claw to its storage recess, the locking pin which is partially engaged in the hole 58 can drop down entirely into the housing as the tool bit drops into the storage recess.

The sleeve 20 in FIG. 6 also shows a tool bit storage collar 59 which is aligned with the waisted section at the base of each tool bit. This collar 59 together with the resilient band 56 in groove 55 of the housing stops tool bits moving axially in the recess during loading and prevents the tool bit in the recess on the underside of the housing from falling out of the recess when the retaining device for the tips of the tools is not in place, such as the movable band.

Figure 7:
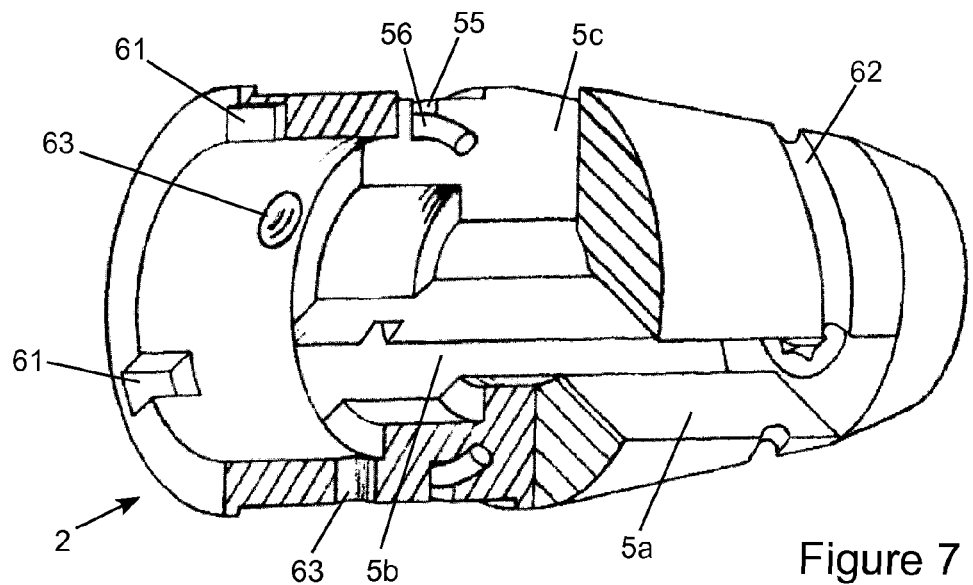
FIG. 7 is a partial cross-section of a modified housing of a third possible embodiment of the present invention.

FIG. 7 shows a similar design of recess to FIG. 4 where each recess is open to the outside of the housing, but here three tool storage recesses 5a, 5b and 5c are shown like FIG. 1. Again a resilient ring 56 is used to provide axial restraint of the tool bits in the storage recesses.

Figure 8:
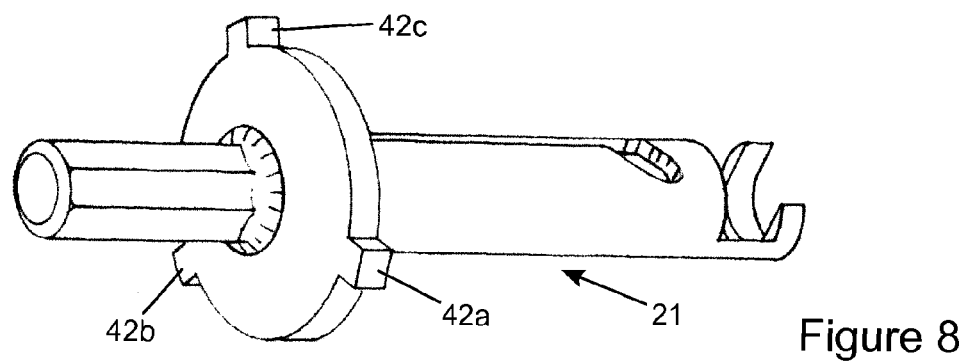
FIGS. 8 and 9 show the bolt and sleeve for the third possible embodiment of the present invention.

In the housings of FIGS. 2 and 4, each storage recess was cut from the input drive end of the housing, so the profile of the recess continued past the region of the base of each tool bit through the region of the bolt flange. However, in FIG. 7, each storage recess can for example be cut from the side of the housing inwards, so does not extend at maximum diameter past the region of the base of each tool bit and through the region of the bolt flange. Therefore drive slots 61 are provided in the housing for the drive nodules 42a, 42b and 42c on the bolt flange of FIG. 8 to engage when the tool is in use. As there are three storage recesses in this example, three such drive slots 61 are provided equi-spaced around the housing, although any multiple of three could be used, such as six slots and drive nodules. The bolt 21 for this design is shown in FIG. 8. The nodules 42a, 42b, and 42c are square shaped to engage in the drive slots 61, although other matching shapes of drive nodule and slot could be used. For example the flange could be of a large diameter with the drive nodules extending axially rather than radially from the flange to engage matching drive slots or other receiving holes in the housing.

The housing of FIG. 7 also shows an alternative arrangement for the restraint of the tip ends of each tool in its storage recess. A groove 62 is cut into the outside of the housing into which a resilient band or spring clip (not shown) can drop.

Figure 9:
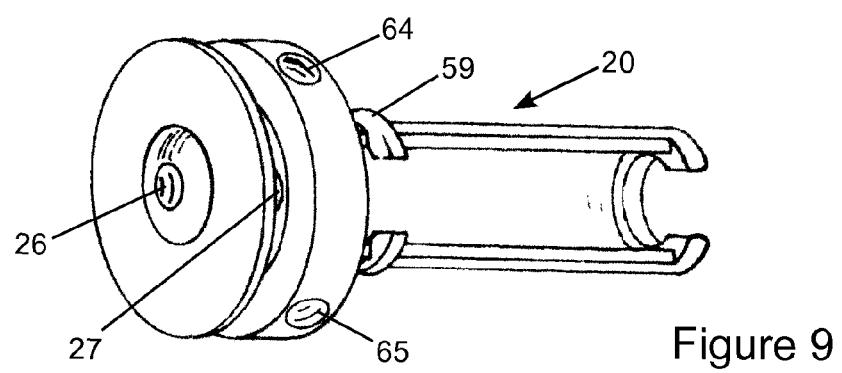
Figure 10:
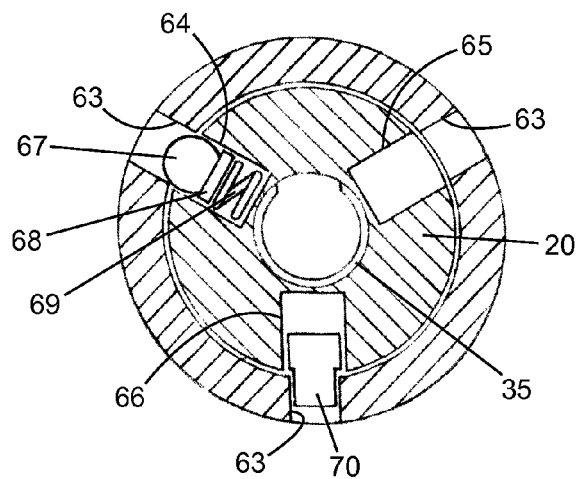
FIG. 10 is a cross-section through the housing and the sleeve of FIGS. 7 and 9.

An alternative sleeve rotation detent and locking pin arrangement is shown in FIGS. 7, 9 and 10. The housing 2 shown in FIG. 7 has three sleeve rotation control holes 63, the number and spacing of these holes being dependent on the number and spacing of the storage recesses. FIG. 10 is a cross-section through the assembled arrangement of housing sleeve and bolt with the bolt withdrawn to the loading position, the section being taken through the three sleeve rotation control holes 63. The sleeve shown in FIG. 9 and in the cross-section of FIG. 10 has three radial holes aligned with the sleeve rotation holes 63 in the housing. Two of these radial holes 64 and 65 are visible in the sleeve in FIG. 9, one of which is used to house the detent ball 67, cap 68 and spring 69. The sleeve rotation detent ball 67 partially engages into one of the sleeve rotation holes 63 in the housing when the channel in the sleeve is aligned with one of the tool storage recesses 5 (not shown). The other radial hole in the sleeve (in this case 65) is optional and can be omitted. The third hole 66 (not visible in FIG. 9) is located opposite the open side of the channel in the sleeve and houses the drop in locking pin 70. This pin 70 can be stepped in profile as shown in FIG. 10 to prevent it passing entirely into or through the sleeve rotation control holes 63 in the housing 2. When the sleeve is in the correct orientation for loading a tool into the claw 35 of the bolt, and the housing is held with the recess for the selected tool upwards so that the selected tool can fall into the claw, the locking pin 70 drops to partially engage into the downwards facing sleeve rotation control hole.

The tool must be rotated to have the empty chamber facing generally downwards (and therefore the locking pin hole 66 upwards) to both unload the current bit into the recess and return the locking pin entirely into the locking pin hole 66. This can prevent a new tool being selected while there is one already loaded in the claw. Once the tool bit and the locking pin have both dropped downwards, the sleeve is free to rotate relative to the housing and the process of selecting a different tool can begin again.

Figure 11:
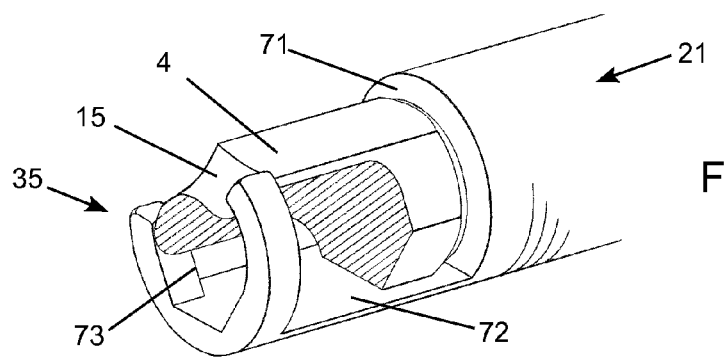
FIG. 11 is a partial view of a bit loaded in the claw.

FIG. 11 shows the claw end of the bolt 21 loaded with a bit 4, the bit being cut away to show detail in the claw 35. A cut between the claw and the rest of the bolt provides a thrust surface 71 and a rotational location surface 72. When the tool bit 4 is selected and drops into the sleeve, the waisted portion of the bit passes into the claw 35. However the rotation of the tool bit needs to be aligned with the drive socket in the housing as the bit is loaded into the operating position. The surface 72 is angled to ensure that when the bit drops into the claw, it sits with (in this example) one of its hexagonal faces on the rotational location surface 72, the rotational position of the bit thereby being set to align the cross section of the body of the bit with the drive socket as the bit is loaded. The thrust surface 71 on the bolt 21 bears on the end of the tool bit 4 as the bit is moved axially through the housing by the bolt during the loading process.

The inside edges 73 of the claw 35 bear on the concave surface of the waisted portion 15 of the bolt 21 as the bolt is drawn back to unload the tool bit 4 from the drive socket. As an upper portion of the claw is open to allow the waisted section of the bit to pass through, when the inside edges 73 of the claw are bearing on the waisted portion of the tool bit during the axial unloading motion, there can be a tendency for the bit to move out of alignment (by motion of the end of the bit towards the open section of the claw). Such misalignment can reduce the free motion of the bit through the drive socket. It can therefore be beneficial to shape the inside edges 73 of the claw 35 such that the upper portions of the claw (either side of the opening) contact the waisted portion of the bit and the lower portions (adjacent the rotational location surface) have a clearance to the waisted portion 15 of the tool bit 4.

Figure 12:
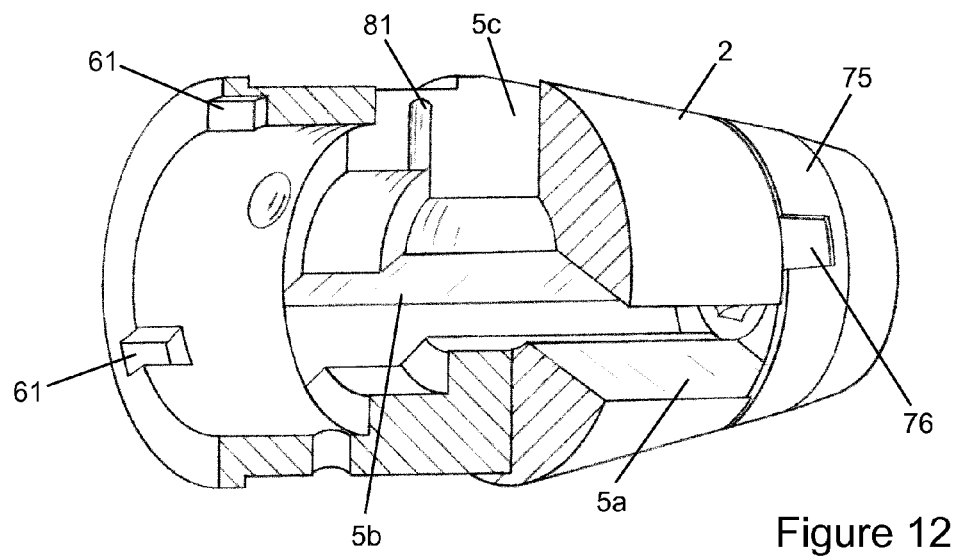
FIG. 12 is a partial cross-section of a modified housing of a fourth possible embodiment of the present invention.

FIG. 12 shows a similar housing to FIG. 7. In FIG. 12 a further alternative tool tip retaining arrangement is shown which can be used with any of the preceding housings in place of the groove and band arrangements at the tool tip end of the recess opening. Instead the sliding ring 75 can be rotated around the housing until the gap 76 in the ring is aligned with the opening of a recess, to enable a tool bit to be placed in or removed from a storage recess.

FIGS. 12 to 15 show an alternative tool bit loading and retaining arrangement towards the wasted end of the tool bits. In FIG. 12 a retainer flange 81 is shown in the waisted region of a stored tool bit.

Figure 13:
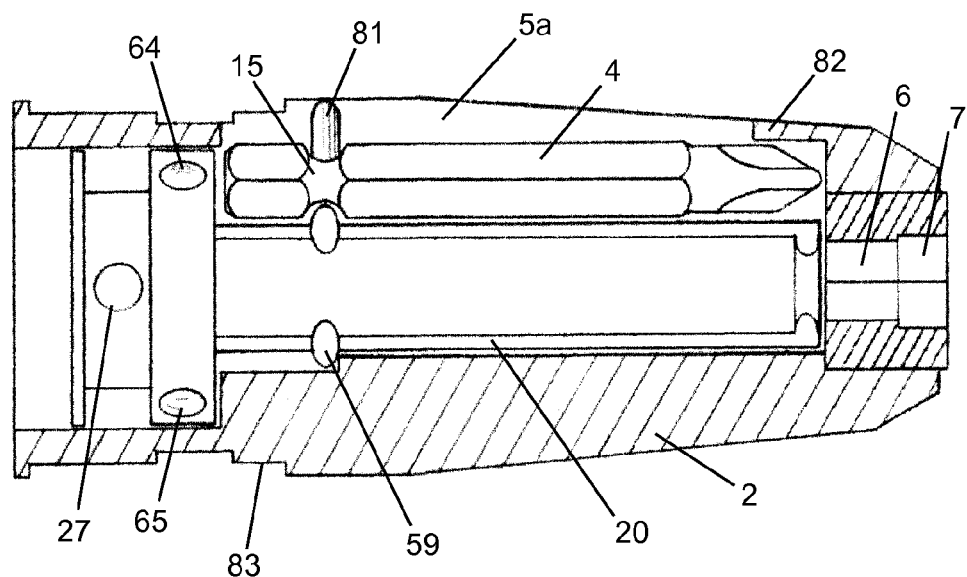
FIG. 13 is a cross-section through the housing of a fifth possible embodiment of the present invention.

FIGS. 13 to 16 show a preferred application of the retainer flange. In FIG. 13 (which is a section through the housing 2) the tool tip retaining band or ring on the housing of earlier figures is replaced with a fixed wall portion 82 at the tip end of the recess opening.

FIG. 13 also shows the sleeve 20 and a tool bit 4 in the sectioned recess 5a. The bolt and other components are omitted for clarity. The tool bit 4 is loaded by sliding the tip of the bit into the recess 5a in the housing until it is behind the fixed wall portion 82 and the waisted portion 15 of the bit is approximately in line with the retaining flange 81. The waisted end of the bit then clears the housing at the end of the recess, so can be dropped into the recess. The waisted portion 15 of the tool bit is aligned with the tool bit storage collar 59 on the sleeve 20 and with the retainer flange 81 on the housing 2. The groove 83 houses a retaining ring (not shown in FIG. 13) which is operated to cover at least a portion of the recess 5a to retain the waisted end of the tool bit 4 once loaded.

Figure 14:
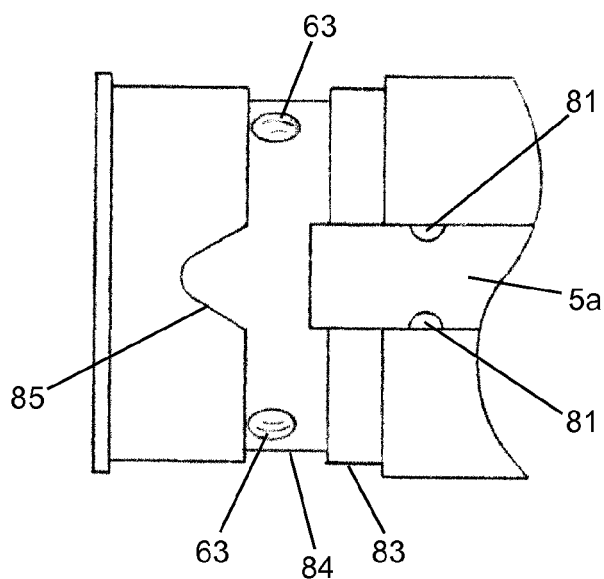
FIG. 14 is a partial view of the housing of FIG. 13.

FIG. 14 is a partial view from the upper edge of the housing in FIG. 13 in which the recess 5a and retaining flanges 81 can be seen.

Figure 15:
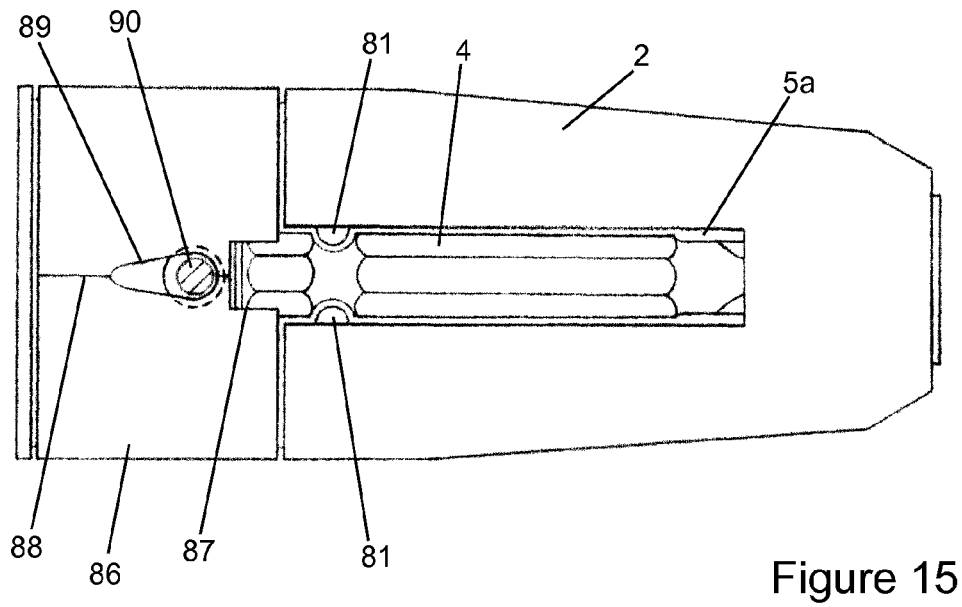
FIG. 15 shows an assembly of a fifth possible embodiment of the present invention with the bolt omitted.

FIG. 15 shows the multi-bit tool in the same orientation as FIG. 14. A tool 4 is loaded in recess 5a and is axially located by retaining flanges 81. The tip of the tool bit is retained behind the fixed wall section and the waisted end of the tool bit is retained by the retaining ring 86 which sits in the groove 83 in FIGS. 13 and 14. The retaining ring 86 has a gap or loading slot 87, the ring being split along a break 88 through this loading slot 87. A tapered slot 89 is also formed in the retaining ring 86 through the break 88. A pin 90 is located in the tapered slot 89. Although the break 88 in the retaining ring 86 is shown extending longitudinally, parallel to the major axis of the multi-bit tool for simplicity, it is preferable for smooth rotational operation of the retaining ring that the break 88 is angled which helps prevent it catching on the housing or other features.

Figure 16:
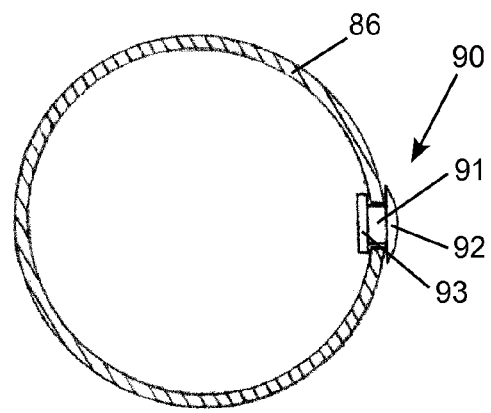
FIG. 16 is a cross-section through the retaining ring subassembly of FIG. 15.

FIG. 16 shows the retaining ring 86 and pin 90. The pin 90 has a shaft portion 91 which passes through the tapered slot 89 of FIG. 15 and has a diameter of similar width to the widest portion of the tapered slot. The pin also has a button or cap 92 on the outer end to allow actuation of the pin to slide it along the tapered slot, and a flange 93 to locate the pin on the retaining ring 86.

The groove 84 shown in the housing in FIG. 14 is formed to allow the flange portion of the pin to sit inside the retaining ring and to allow the retaining ring and pin assembly to be rotated around the housing. Similarly the guide slot 85 is formed to allow the pin 90 to be pushed along the housing towards the narrow end of the tapered slot 89 when the loading slot in the retaining ring is aligned with the recess 5a. Similar guide slots can be provided for each recess.

The operation of the alternative bit loading arrangement of FIGS. 13 to 16 therefore includes rotating the retaining ring 86 until the gap or loading slot 87 is aligned with the storage recess to be unloaded and/or loaded. The cap 92 of the pin 90 is then pushed to slide the pin towards the narrow end of the tapered slot 89, thus expanding the break 88 in the ring and widening the loading slot 87 to allow the end of a tool bit to pass through. The guide slot 85 ensures that the loading slot is opened for loading in line with a storage recess, the tapered sides of the guide slot helping rotate the retaining ring to ensure the loading slot is closely aligned with the storage recess. The retaining ring 89 can return the pin 90 to the wide end of the tapered slot 89 when the cap of the pin in released (or the user can slide the pin back to the wide end of the tapered slot) to ensure that the loading slot is returned to a reduced width so that the edges of the slot retain the tool bit in the recess. The retaining ring can then also be rotated so that the loading slot is no longer aligned with a storage recess thus completely closing the end of the recess over the waisted end of the bit 4.

One advantage of such an unloading and/or loading arrangement is that the user does not need to rotate the bolt and sleeve of the tool to select the recess to make it easier to load or unload the tool bit.

Figure 17:
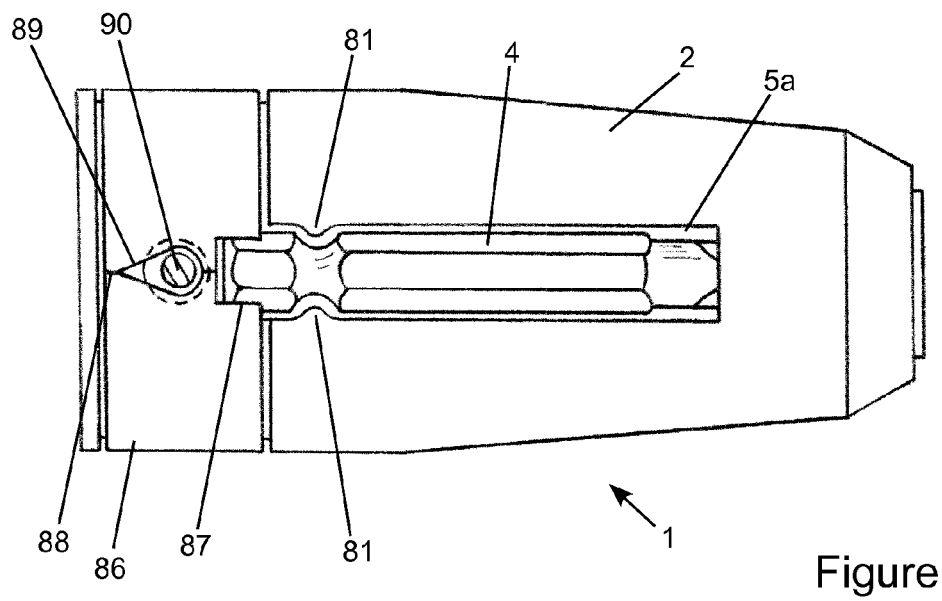
FIG. 17 shows an assembly of a sixth possible embodiment of the present invention with the bolt omitted.

FIG. 17 shows a multi-bit tool assembly incorporating the bit loading arrangement of FIGS. 13 to 16 including the retaining ring 86 and loading pin 90. The button of the loading pin 90 can again be used to slide the loading pin 90 towards the narrow end of tapered slot 89 to widen the retaining ring along break 88, increasing the width of the gap or loading slot 87 to permit the waisted end of the tool bit 4 to pass through for loading and unloading of the tool bit 4 from the multi-bit tool 1. However, the length of the retaining ring 86, housing 2 and of the multi-bit tool assembly is reduced compared to the previous figures. This is due in part to the use of an alternative axial location arrangement to the sleeve locating pin 11 and axial locating groove 23 around the sleeve in FIGS. 2 and 3.

Figure 18:
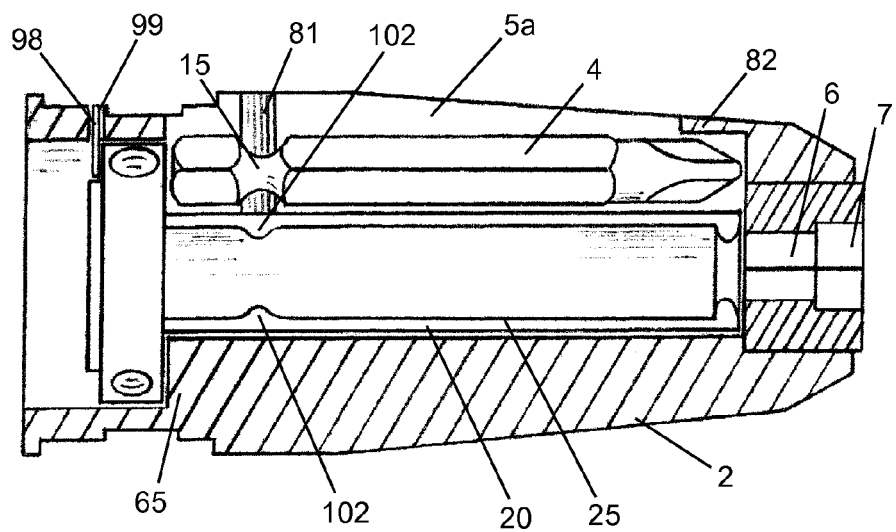
FIG. 18 is a cross-section through the housing of FIG. 17.
Figure 19:
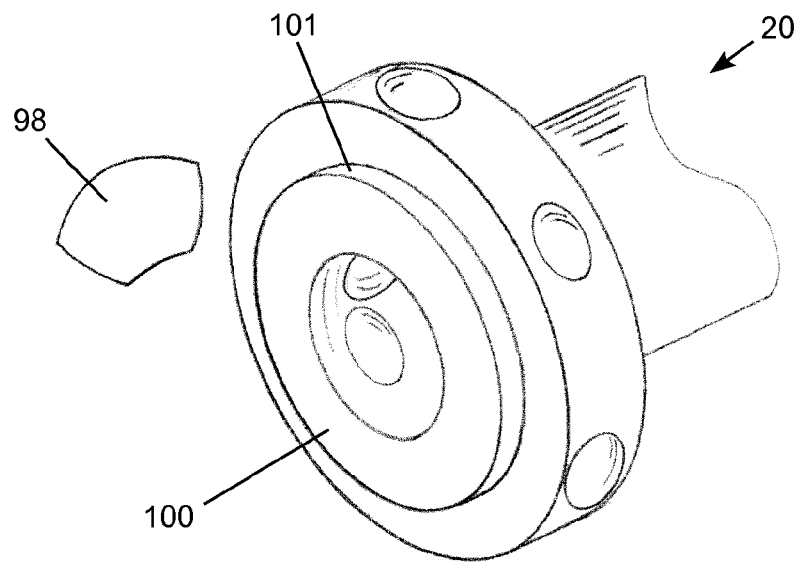
FIG. 19 is a partial view of the sleeve of FIG. 18.

FIG. 18 shows a perpendicular section through the multi-bit tool of FIG. 17, with only the housing 2, the sleeve 20 and a tool bit 4 shown, the other parts being omitted for clarity. Also shown is a locating tab 98 for locating the sleeve 20 axially relative to the housing 2 in one direction. The locating tab 98 is inserted through a slot 99 in the housing 2, the retaining ring 86 (not shown) also providing the function of retaining the locating tab 98 in the housing 2. As can be seen in FIG. 19, the end face 100 of the sleeve 20 includes a step 101 for the locating tab 98 to seat against when assembled.

In FIG. 18, the housing includes retainer flanges 81 in the side of the storage recess 5a as in FIG. 15. However the sleeve 20 also includes loading control nodules 102 which retains the tool until the channel in the sleeve is aligned with a storage recess. The loading control nodules 102 replace the tool bit storage collar 59 on the sleeve 20 of FIG. 13. This permits the bore in the housing to have only one step along the length of the sleeve as clearance for the collar 59 is no longer required.

Figure 20:
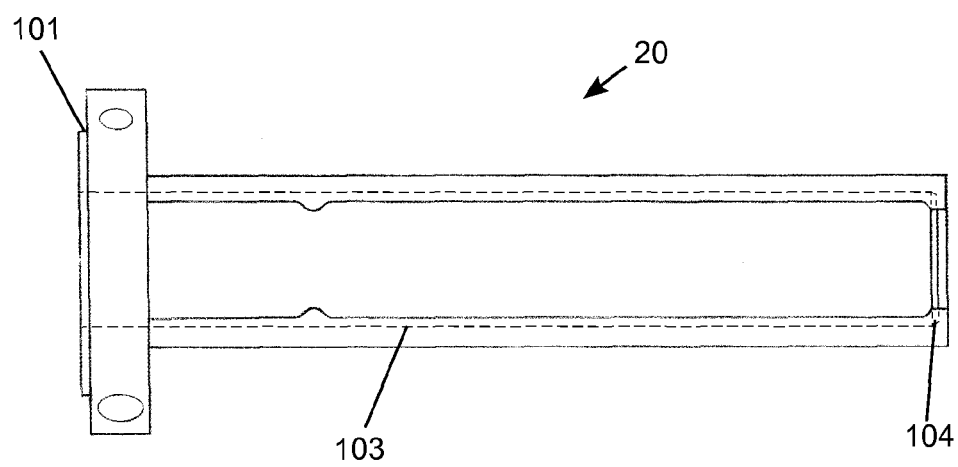
FIG. 20 is a side view of the sleeve of FIG. 18.

FIG. 20 shows the sleeve 20. As indicated by the dashed lines in FIG. 20, the bore 103 through the sleeve 20 is preferably linear to house the sliding bolt 21 (not shown) apart from an optional shoulder 104 which may be tapered to prevent tool bits catching on the end as the bolt is slid into the working position.

Figure 21:
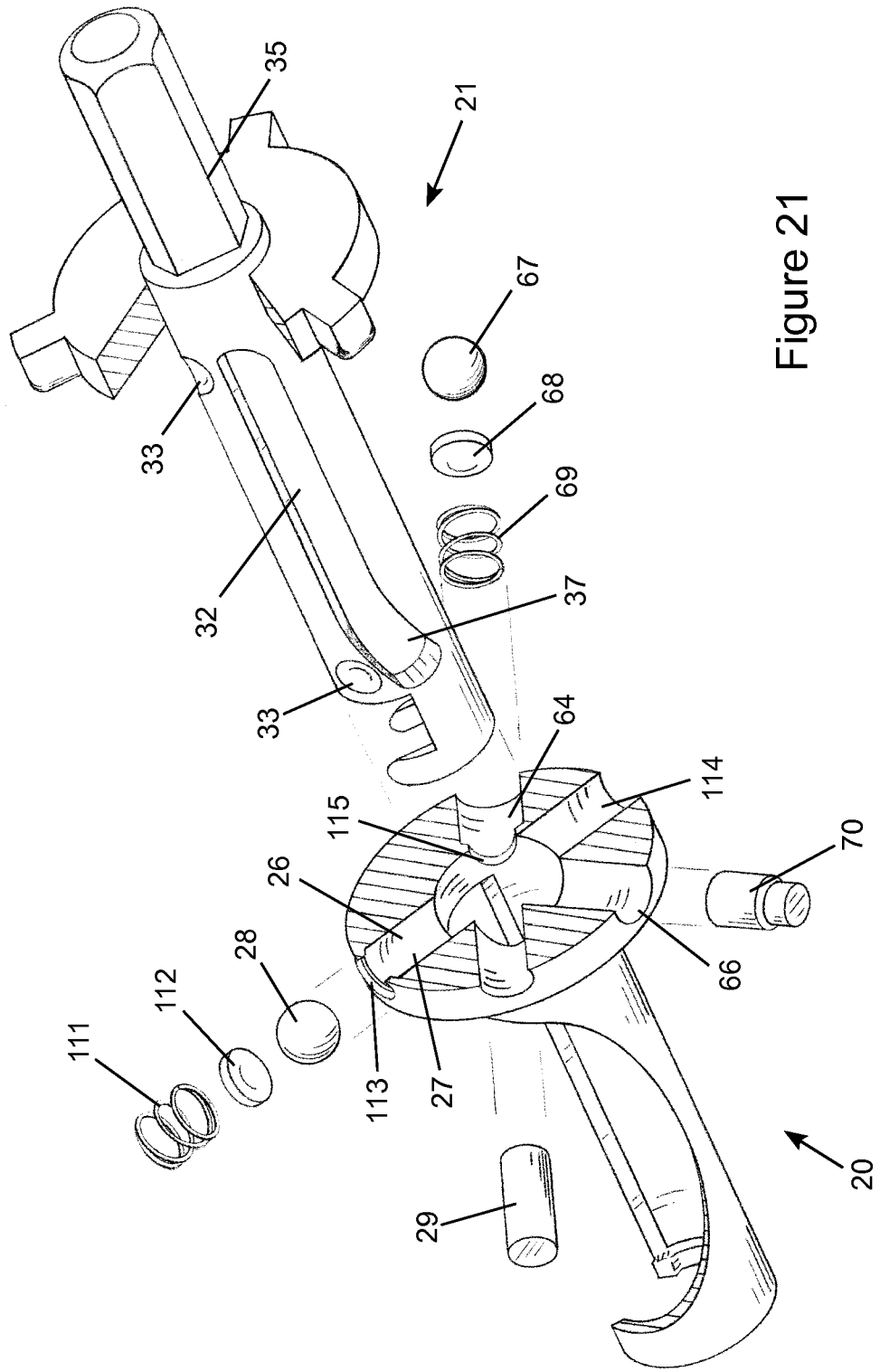
FIG. 21 shows a partial cross section of the bolt and sleeve of the sixth possible embodiment of the present invention.
Figure 22:
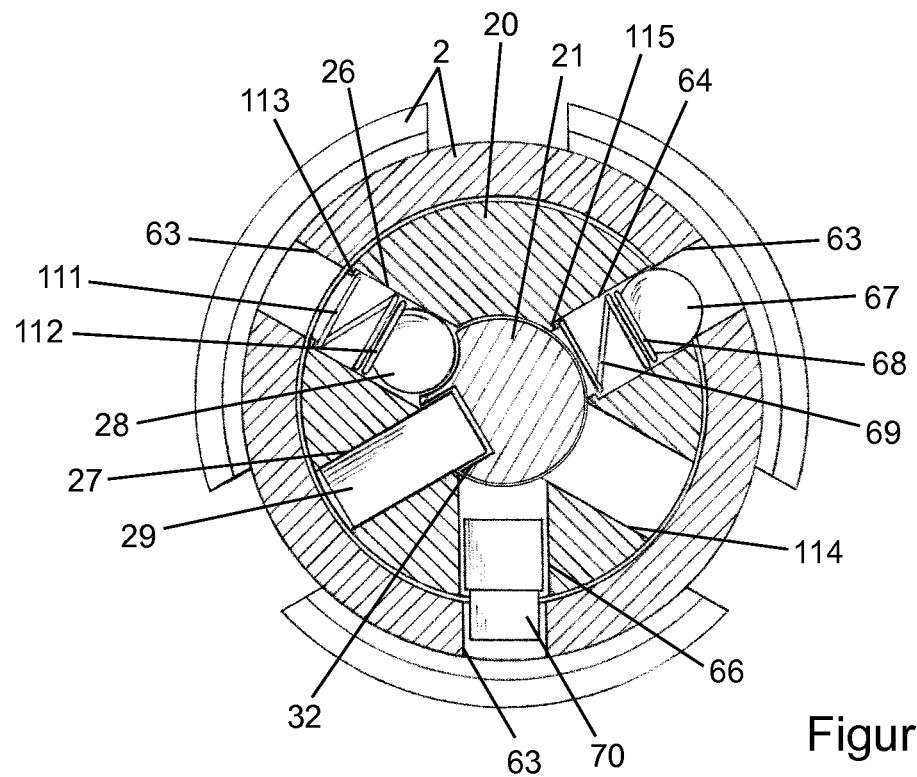
FIG. 22 is a cross-section through the housing, sleeve and bolt of FIGS. 17 to 21.

The reduction in length of the multi-bit tool of FIG. 17 compared to the embodiments in the previous Figures is in part achieved by locating the radial holes 64 and 66 for the sleeve rotation detent ball 67 and drop-in locking pin 70 (shown and described in FIGS. 7 to 10) in the same plane as the radial holes 26 and 27 for the bolt slide detent ball 28 and pin 29, as shown in section in FIGS. 21 and 22.

FIG. 21 is an exploded view of a sleeve 20 and bolt 21 to suit the multi-bit tool of FIG. 17. The sleeve 20 is also sectioned through the radial holes for the detent ball 28 and pin 29 for the bolt slide which are similar in operation to those in FIGS. 3, 6 and 9. However, the spring clip 30 is omitted, the bolt slide detent ball 28 now being resiliently loaded into the bolt slide detent depression by a spring 111.

FIG. 22 is an end view of the multi-bit tool of FIG. 17, also sectioned through the radial holes in the sleeve. The bolt slide detent spring 111 can have a cap 112 provided between one end of the spring and the ball and acts against a shoulder 113 on the outer end of the radial hole 26. As the outer end of the hole 26 is of a smaller diameter than the main length of the hole, an access hole 114 is shown through the sleeve 20 on the opposite side of the bolt 21. The access hole 114 can be used to load the bolt detent ball 28 against the spring 111 during assembly of the multi-bit tool. The bolt slide pin 29 may be retained in the radial hole 27 by the housing 2 and is of sufficient length to engage the bolt slide groove 32. However this is not possible when the diameter of the sleeve rotation control holes 63 in the housing are larger than the diameter of the bolt slid pin 29 so the pin 29 may be a press fit in the radial hole 27. To enable disassembly of the bolt 21 from the sleeve 20, a small hole (not shown) can be formed through the bolt, preferably in the straight portion of the bolt slide groove 32, near the angled portion of the bolt slide groove 37, allowing a tool to be inserted through the small hole via the sleeve location spring detent hole 64 in the sleeve to press the bolt slide pin 29 out of the sleeve 20.

The spring detent radial hole 64 can be blind as shown in FIG. 10. However if it is required for access to press out the bolt slide pin as noted above, it can extend through to the bore through the centre of the sleeve which accommodates the bolt 21 as shown in FIGS. 21 and 22, in which case a shoulder 115 is preferably provided on which the sleeve rotation detent spring 69 can act.

It can be desirable to provide some form of locking mechanism to prevent the bolt from being withdrawn from the working position towards the loading position while the multi-bit tool is in use. One possible embodiment of locking mechanism is shown in FIGS. 23 to 26.

The locking tab 121 (shown also to the side of FIG. 23) in this example has a top plate portion 122 and a perpendicular pivot plate portion 123. The top plate portion engages a slot 124 cut into the flange 41 of the bolt 21, although it could alternatively be designed to simply swing partially over the top face 125 of the flange or any of the nodules or protrusions 42a, 42b or 42c to prevent the bolt from sliding out from the working position.

Figure 23:
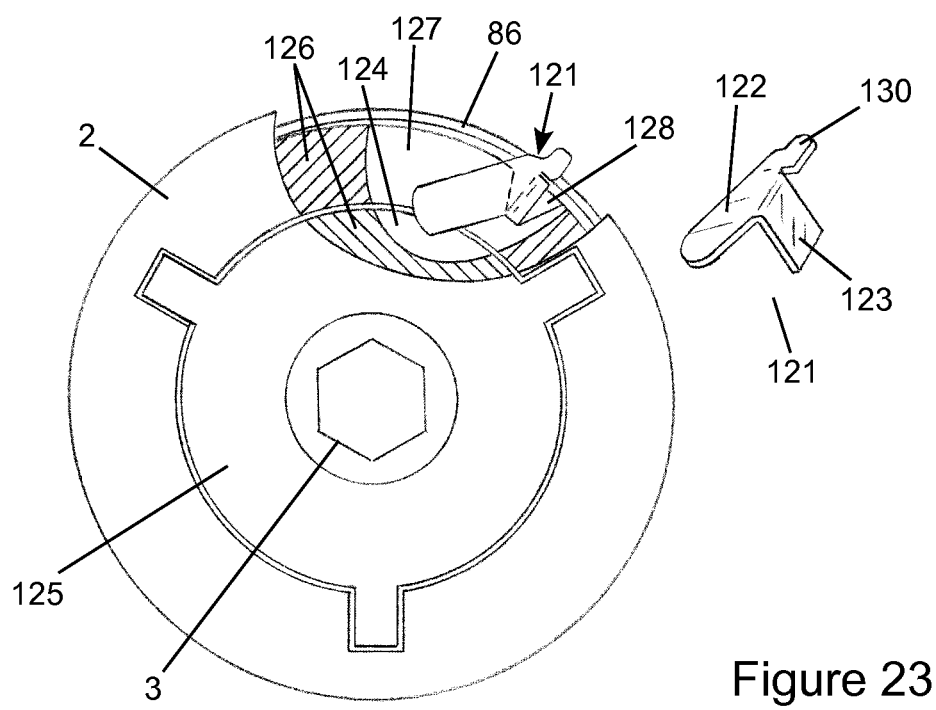
FIG. 23 is an end view of a seventh possible embodiment of the present invention including a cut-away to reveal a locking tab.

FIG. 23 has a partial section 126 (of the end of the housing 2 and the end of the bolt flange 41) cut away to reveal the locking tab 121, the slot 127 in the housing in which the top plate portion 122 operates and the V-shaped pivot channel 128 in which the pivot plate portion 123 operates. The pivot plate portion 123 of the locking tab 121 is retained in the pivot channel 128 by the retaining ring 86. As can be seen in FIG. 23, when the locking tab is in the mid position (neither fully engaged nor disengaged) the pivot plate portion 123 pushes the retaining ring outwards. This design provides an "over-centre" action, helping to hold the locking tab in the selected fully engaged or fully disengaged position.

Figure 24:
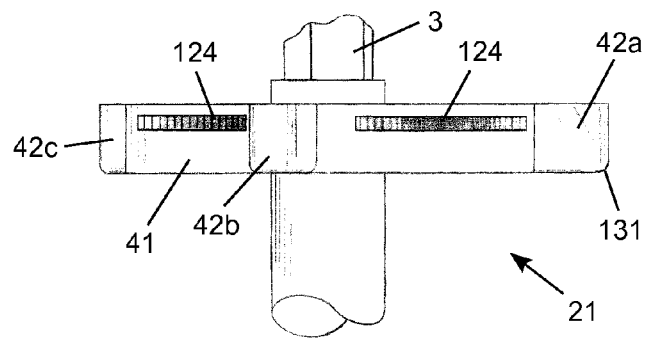
FIG. 24 is a partial side view of the bolt of FIG. 23.

FIG. 24 is a partial side view of the bolt 21 having the locking tab slot 124 cut into the flange 41 showing two of the locking tab slots 124. There is a locking tab slot cut into the bolt for every tool storage chamber present in the housing.

Figure 25:
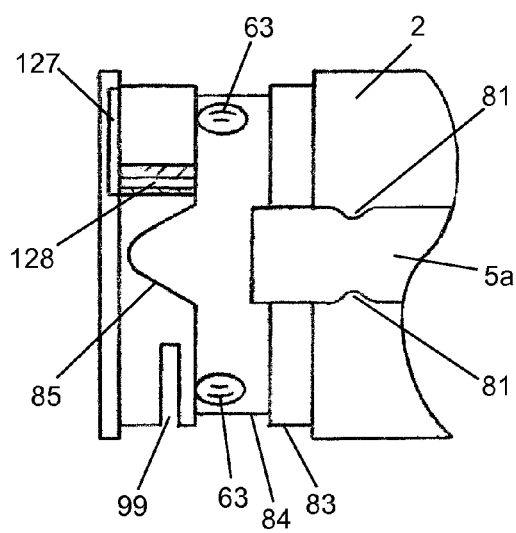
FIG. 25 is a partial side view of the housing of FIG. 23.

FIG. 25 is a partial side view of the housing 2 showing the slot 127 in the housing through which the locking tab top plate portion rotates, the V-shaped pivot channel 128 in the housing in which the locking tab pivot plate portion 123 operates and the slot 99 in the housing which accommodates the locating tab from FIGS. 18 and 19.

Figure 26:
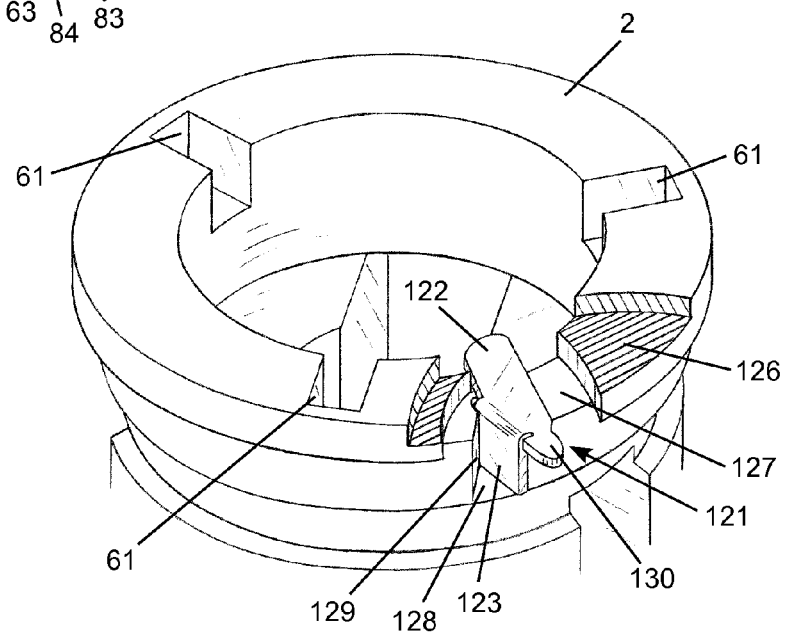
FIG. 26 is a partial view of the seventh possible embodiment of the present invention including a cut-away to reveal the locking tab.

FIG. 26 has a partial section 126 of the end of the housing 2 cut away again to reveal the locking tab 121. When the locking tab is in the engaged position shown in FIG. 26, the pivot plate portion is held against one side of the V-shaped pivot channel 128 by the retaining ring (not shown). When the locking tab is in the disengaged position, the pivot plate portion is against the face 129 of the channel 128. The locking tab 121 can be selectively rotated between the engaged and disengaged positions using the lever portion 130 of the locking tab extending from the top plate portion 122. When assembled, the only part of the locking tab 121 visible is the lever portion 130 which protrudes slightly from the housing 2. Other shapes and positions of lever portion 130 can be used to avoid the lever portion protruding outside the outer radius of the housing. The top face of the housing may include a small cut-out section to accommodate such alternate lever portions.

The multi-bit tool can be driven using a power tool by loading the drive input shaft 40 into the chuck of a drill or other power driver tool. The drive input shaft 40 is shown as a hex shaft in the figures, which is preferable for all 3 jaw chucks (and can be the same size as the tool bits 4 for use with other driver tools).

Alternatively the multi-bit tool can be driven by a handle 141 such as that shown in FIG. 27, i.e. used as a hand tool. In FIG. 27 the handle is shown in cross section and includes a drive socket 142 to engage with the drive input shaft 40 of the tool. A button 143 and rod 144 are shown to help release the handle 141 from the drive input shaft. The handle can also be used to store additional tool bits 145 which can include tool bits to interchange with those in the storage chambers in the housing of the multi-bit tool and or tool bits of the larger drive size of the second drive socket 7. To this end, storage chambers 146 are shown in the housing. To prevent the tool bits all falling out of the housing at once or at undesirable times such as removing the handle from the drive input shaft of the multi-bit tool, a selector disc 147 is optionally located at the end of the storage chambers. FIG. 28 shows a view of the end of the handle 141 which engages with the multi-bit tool, the selector disc being omitted. This selector disc 147 is shown in FIG. 29, where the channel or gap 148 can be seen allowing only one storage recess in the handle to be open at any one time. If the drive input shaft is the same size as at least some of the tool bits, those tool bits can be directly inserted into the drive socket 142 allowing the handle and bits to be used as a stubby screw driver for example. Carrying a power driver and the handle in addition to the multi-bit tool can provide great flexibility and further increase efficiency when work is not carried out in a fixed location, such as building construction, roofing or fencing.

The drive socket of the handle can include a groove or holes in the drive faces to receive a detent ball. This can be used to provide sufficient axial location of the handle onto the input shaft of the multi-bit tool to ensure that in use, the handle stays on the input shaft. As there can be axial forces generated during tool bit changing operations (due to the detent mechanism on the bolt slide for example) the force needed to separate the handle from the input shaft of the multi-bit tool needs to be greater than the bolt slide detent force.

The bolt slide detent is primarily used to keep the bolt returned within the housing. The greatest force that unintentionally draws the bolt back in the housing typically occurs when a larger screw head is loaded torsionally in the larger drive socket (such as having just tightened a tek screw for example), which causes a partial bind up between the screw and socket. Then when the tool is pulled away from the screw (to move on to the next one) the bolt can be drawn back relative to the housing rather than the tool being disconnected from the screw. As the force of the detent on the drive input of the multi-bit tool needs to be higher than the force of the bolt slide detent, increasing the force of the bolt slide detent to prevent unintentional drawing back of the bolt can be undesirable.

To limit the strength of bolt slide detent required, a lock can optionally be provided to prevent the bolt from being drawn back unintentionally, such as shown and described in FIGS. 23 to 26. There are many other variations, for example, a short arm on a pivot can be connected to the housing such that the arm can be rotated to cover one of the nodules or any other part of the flange of the bolt. The arm could be spring loaded into the locked position or automatically move to the locked position when the tool is driven (for example under centrifugal force). The arm could use a friction or detent mechanism to allow the user the choice of having the lock operational or not as it may not be required or of sufficient benefit in all applications.

The outer edge of the driving nodules or protrusions 42a, 42b, 42c (ie the edge between the outward facing surface and the other non-driving surface of each nodule which is at the bottom of the drive slot in the working position) can have a chamfer or radius as shown at 131 in FIG. 24. For example, a chamfer of 45 degrees and half the height of the nodule can virtually eliminate the possibility of fingers or other objects being pinched between the nodules and the housing as the bolt is returned to the working position. As the chamfer or radius on the outer edge of the nodule runs substantially perpendicular to the drive faces of the drive slots 61 in the housing, it does not interfere with the drive between the nodules of the bolt and the drive slots of the housing in either clockwise or anti-clockwise driving directions (other than a small reduction in surface area of active drive face). Similarly, a radius or chamfer can be added to the corresponding outer edge of the circular portion of the flange 41.

The use of a second larger drive size socket 7 can be applied to other multi-bit tools. For example a multi-bit tool could store bits in the housing, but not include a loading mechanism, the desired tool being manually removed from its storage recess in the housing and inserted into the appropriate size drive socket, or a tool changing mechanism other than that described above could be employed.

The tool changing mechanism described above can be used with just a single drive socket if desired, i.e. the second larger drive socket 7 can be deleted to reduce the length of the tool should such function not be required.

The tool changing mechanism can be integrated into the end of a power driver, ie the drive input shaft may not be visible, being driven from the motor of the power driver without a chuck. This can provide a reduced length in line with the tool bit by removing the chuck mechanism. Further reductions in the dimension of the whole assembly in line with the particular tool bit in use can be gained by utilising a driver design with the motor in the handle, at an angle of approximately 100 degrees with the line of the tool bit, with for example bevel gears used to transmit the drive between the axis of the hand grip or handle and the axis of the tool bit or multi-bit tool mechanism. In this case the drive input portion of the bolt would include a bevel gear for example rather than a hexagonal shape drive portion.

Similarly, the drive input shaft of the multi-bit tool could terminate in a nut to fit directly on to the drive bolt of a drill in place of the chuck. If the drill uses alternative fastenings to the chuck, these can also be fitted on to or in place of the input shaft. The multi-bit tool then sits in the space usually occupied by the drill chuck, turning the drill into a driver without having to keep the additional length of the drill chuck. Alternatively, the drive input shaft could be hollow and threaded internally to effectively form a nut directly onto the flange of the bolt.

The invention claimed is:

1. A multi-bit tool including a housing incorporating at least two tool storage recesses, a bore and a drive socket portion axially aligned with the bore, each recess providing a storage location for a tool bit,
   a sleeve axially located to permit rotation in the bore of the housing, the sleeve including a flange portion and a slot portion,
   a bolt slidably located in the sleeve between a bit loading position and a working position, the bolt having a claw, a bolt flange portion and a drive input portion,
   the claw being provided to accommodate a drive end of a tool bit and provide axial location of the tool bit relative to the bolt,
   the flange portion including at least one eccentric protrusion extending radially from the bolt flange to engage with the end of one of said at least two recesses to provide rotational location of the bolt relative to the housing,
   the drive input portion of the bolt receiving drive input to the tool, the bolt flange portion transferring the drive from the bolt to the housing to thereby transmit the drive input to the drive socket portion of the housing.

2. A multi-bit tool according to claim 1 wherein the drive socket portion include a tool bit drive socket for driving the tool bits stored in the housing and an additional, larger drive socket at the end of the housing for driving external tool bits or fasteners.

3. A multi-bit tool as claimed in claim 1 wherein the bolt includes a shaped slot and the sleeve includes a radial hole, a pin being provided in the radial hole to engage in the shaped slot in the bolt such that as the bolt slides axially within the sleeve, a maximum axial displacement of the bolt relative to the sleeve is limited in at least one direction and the rotational position of the bolt relative to the sleeve is controlled.

4. A multi-bit tool as claimed in claim 1 wherein the sleeve includes a radial hole, a detent ball being spring-loaded along the axis of the radial hole to engage with one of two detent depressions made in the bolt at the bit loading position and the working position of the bolt.

5. A multi-bit tool as claimed in claim 1 wherein the housing includes a radial hole, a detent ball being spring-loaded along the axis of the radial hole to engage with a respective detent depression made in the sleeve at each position where the slot portion of the sleeve is radially aligned with one of said at least two recesses.

6. A multi-bit tool as claimed in claim 1 wherein the flange portion provides a stop limiting the axial travel of the bolt relative to the housing in one direction.

7. A multi-bit tool as claimed in claim 1 wherein the at least two recesses may be spaced equi-distant around the bore.

8. A multi-bit tool as claimed in claim 1 wherein the drive input portion of the bolt is driven by a power tool.

9. A multi-bit tool as claimed in claim 1 wherein the bolt includes a rotational location surface adjacent the claw, the rotational location surface being parallel to a major axis of the bolt and positioned to align the drive end of the tool bit with the tool bit drive socket as the bit passes from the loading position to the working position.

10. A multi-bit tool as claimed in claim 1 wherein there is provided at least one locking pin hole in the housing, each locking pin hole including a locking pin, and
the multi-bit tool further including a locking pin hole in the sleeve for each of said at least two tool storage recesses, a locking pin dropping partially into the locking pin hole in the sleeve when a bit is selected to prevent rotation of the sleeve relative to the housing, the locking pin dropping out of the hole in the sleeve when a bit is unloaded to permit relative rotation between the sleeve and the housing.

11. A multi-bit tool as claimed in claim 1 wherein there is provided a locking pin hole in the sleeve, a locking pin being provided in said locking pin hole in the sleeve,
the multi-bit tool further including a locking pin hole in the housing for each of said at least two tool storage recesses, the locking pin dropping partially into one of the locking pin holes in the housing when a bit is selected to prevent rotation of the sleeve relative to the housing, the locking pin dropping out of the hole in the housing when a bit is unloaded to permit relative rotation between the sleeve and the housing.

12. A multi-bit tool as claimed in claim 1 wherein the drive input portion of the bolt is driven by a handle such as a screw driver handle.

13. A multi-bit tool as claimed in claim 12, wherein the handle includes storage for additional tool bits.

14. A multi-bit tool including a housing and a drive input shaft, the housing including a first and a second socket, each axially aligned with the drive input shaft, the first socket being smaller than the second socket and positioned intermediate the second socket and the drive input shaft such that tool bits driven by the first socket pass through the second socket to drivably engage with the first socket.

15. A multi-bit tool as claimed in claim 14 wherein the first socket is a tool bit drive socket and the second socket is a larger tool bit drive socket than the first socket, such that the second socket is able to drive tool bits with a higher torque rating than tool bits for the first socket.

16. A multi-bit tool as claimed in claim 14 wherein the first socket is a tool bit drive socket and the second socket is a fastener drive socket.

17. A multi-bit tool as claimed in claim 16 wherein the housing directly drives fasteners through the fastener drive socket feature.

18. A multi-bit tool as claimed in claim 14 wherein the drive input shaft has at least 3 sides in cross-section.

19. A multi-bit tool as claimed in claim 14 wherein the drive input shaft is fixed to the housing.

20. A multi-bit tool as claimed in claim 14 wherein the housing incorporates at least two storage recesses.

21. A multi-bit tool as claimed in claim 20 wherein the housing further incorporates a bore, the bore being axially aligned with the drive input shaft and the first and second sockets, the tool further including
a sleeve axially located to permit rotation in the bore of the housing, the sleeve including a flange portion and a slot portion,
a bolt slidably located in the sleeve between a bit loading position and a working position, the bolt having a claw, a flange portion and a drive input portion, the drive input portion of the bolt being the drive input shaft,
the claw being provided to accommodate a drive end of a tool bit and provide axial location of the tool bit relative to the bolt,
the flange portion including at least one eccentric protrusion extending radially from the flange to engage with the end of one of said at least two storage recesses to provide rotational location of the bolt relative to the housing such that in use, the tool drives bits through the drive input shaft receiving drive input to the bolt part of the tool, the flange portion of the bolt driving the housing to thereby transmit the drive input to the first and second sockets of the housing.

* * * * *